(12) United States Patent
Flögel et al.

(10) Patent No.: US 7,140,256 B2
(45) Date of Patent: Nov. 28, 2006

(54) RELATIVE PRESSURE SENSOR

(75) Inventors: Karl Flögel, Schopfheim (DE); Sergej Lopatiin, Lörrach (DE); Elke Schmidt, Schopfheim (DE); Thomas Uehlin, Schopfheim (DE); Olaf Textor, Lörrach (DE); Michael Hügel, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/500,153

(22) PCT Filed: Dec. 22, 2002

(86) PCT No.: PCT/EP02/14787

§ 371 (c)(1),
(2), (4) Date: Feb. 22, 2005

(87) PCT Pub. No.: WO03/058186

PCT Pub. Date: Jul. 17, 2003

(65) Prior Publication Data
US 2005/0139009 A1    Jun. 30, 2005

(30) Foreign Application Priority Data
Jan. 10, 2002    (DE)    ............................... 102 00 780

(51) Int. Cl.
*G01L 15/00* (2006.01)

(52) U.S. Cl. .......................................... 73/716; 73/747
(58) Field of Classification Search .................. 73/716, 73/747
See application file for complete search history.

(56) References Cited

U.S. PATENT DOCUMENTS

| 6,639,724 B1* | 10/2003 | Bower et al. ............... 359/599 |
| 2002/0181110 A1* | 12/2002 | Bower et al. ............... 359/599 |
| 2005/0269256 A1* | 12/2005 | Haq et al. .................... 210/490 |

FOREIGN PATENT DOCUMENTS

| EP | 0 974 825 A2 | 1/2000 |
| EP | 1 070 948 A1 | 1/2001 |
| WO | WO 03/058186 A2 | 7/2003 |

\* cited by examiner

*Primary Examiner*—Edward Lefkowitz
*Assistant Examiner*—Andre Allen
(74) *Attorney, Agent, or Firm*—Bacon & Thomas

(57) ABSTRACT

A pressure sensor for measuring a pressure difference between a pressure being measured and the ambient atmospheric pressure surrounding the pressure sensor, including a platform and a membrane loadable with a pressure being measured. The membrane is secured at its edge to the platform, with a pressure chamber thus being formed between the platform and the measuring membrane. The pressure chamber communicates over a reference air path with the atmosphere, with the reference air path being a winding path.

17 Claims, 1 Drawing Sheet

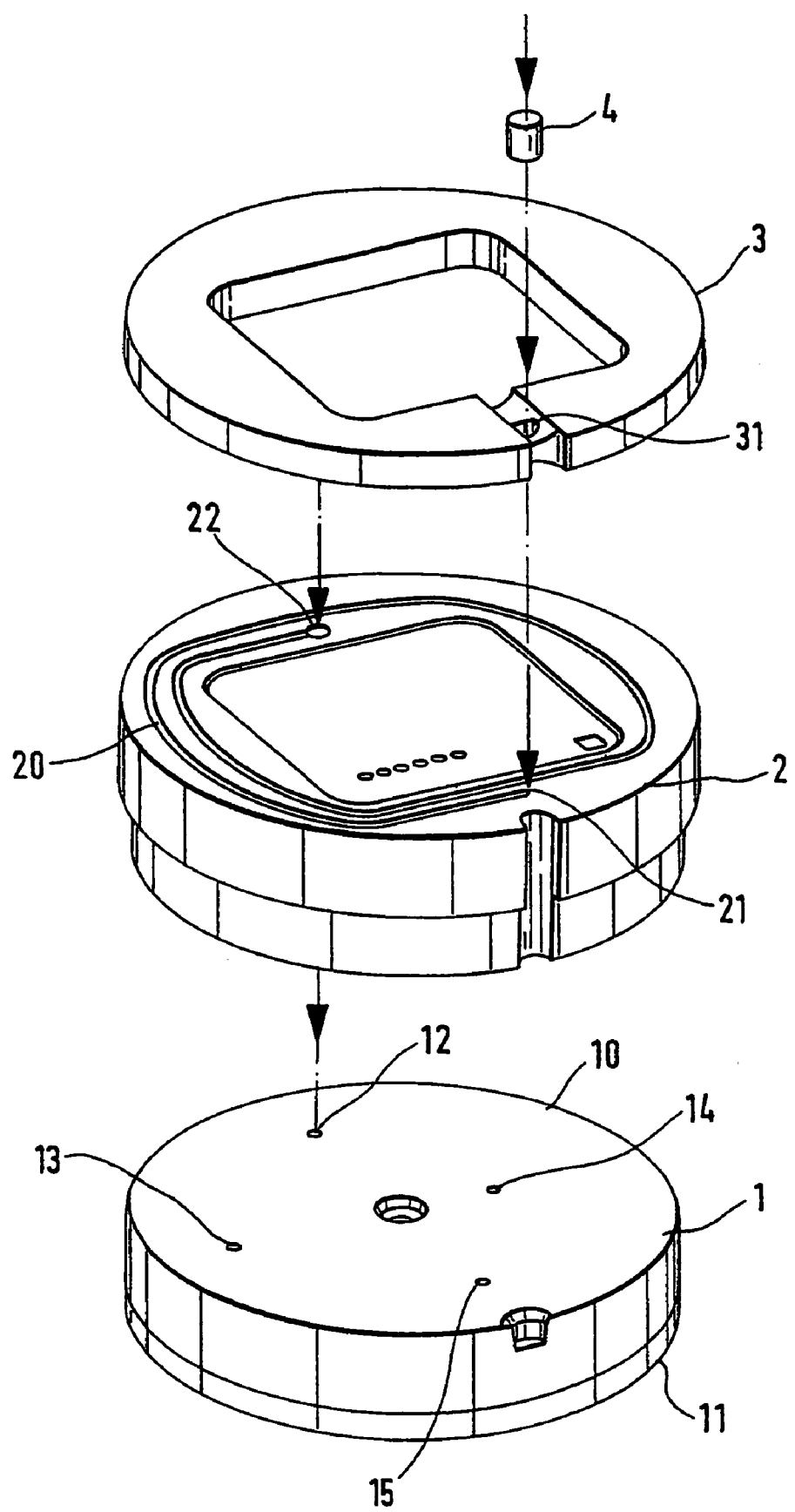

RELATIVE PRESSURE SENSOR

FIELD OF THE INVENTION

The present invention relates to a relative, or gage, pressure sensor. Relative pressure sensors usually measure the difference between the pressure in a medium being measured and the current ambient atmospheric pressure. A relative pressure sensor includes, in general, a platform on which a measuring membrane, or diaphragm, is attached pressure-tightly at its edge, with a pressure chamber being formed between the measuring membrane and the platform. For relative pressure measurement, reference air is introduced into the pressure chamber through an opening in the platform, and the measuring membrane surface facing away from the measuring chamber is exposed to the pressure being measured. The resulting deformation of the measuring membrane is a measure of the relative pressure, and this is transduced in suitable manner into a measurement signal.

BACKGROUND OF THE INVENTION

The mentioned introduction of the reference air can bring moisture into the pressure chamber, which then condenses in the interior of the sensor when the temperature falls below the dew point. This can degrade the functioning of the sensor. Such is especially a problem, when the air surrounding the sensor has a higher temperature than the medium whose pressure is being measured.

Hegner et al. disclose in European Patent Application EP 0 974 825 A3 a relative pressure sensor, which has a reference air path with a moisture filter. The moisture filter is arranged in the front area of the relative pressure sensor, near the measuring membrane, thus near the medium, so that the temperature of the moisture filter is similar to the temperature of the media. This arrangement assures that moisture in the reference air can condense out before it even gets into the reference air path, so that there is hardly any possibility of a falling below the dew point in the pressure chamber. The described arrangement is, however, comparatively costly.

Other relative pressure sensors have a capillary tube communicating with the platform-side opening of the pressure chamber. The capillary tube serves as a reference air path, while opposing encroaching moisture with a certain diffusion resistance. The capillary tube is frequently a small metal tube, which, for example, is secured to the platform by glazing. This manner of assembly is accompanied, likewise, by an increased manufacturing cost. Additionally, the entrance opening of the capillary tube is largely thermally de-coupled from the pressure measuring cell, so that, in the case of higher temperatures at the entrance opening, air with a high water content can get into the capillary tube, which leads to falling below the dew point in the colder pressure chamber. The condensation in the measurement cell is significantly delayed and even decreased by the described arrangement, but it cannot, however, be prevented by this technique.

SUMMARY OF THE INVENTION

It is, consequently, an object of the present invention to provide a relative pressure sensor having a simple and compact construction, which delays, respectively decreases or prevents, the incursion of moisture more effectively. The object is achieved by a pressure sensor including a platform and a measuring membrane loadable with a pressure being measured, with the measuring membrane secured at its edge to the platform, with a pressure chamber being formed between the platform and the measuring membrane, with the pressure chamber communicating over a reference air path with the atmosphere, the reference air path including a winding path.

The pressure sensor of the invention for measuring a pressure difference between a pressure being measured and the ambient atmospheric pressure includes a platform and a membrane loadable with the pressure being measured. The membrane is secured at its edge to the platform, with a pressure chamber in this way being formed between the platform and the measuring membrane. The pressure chamber communicates over a reference air path with the atmosphere, with the reference air path being a winding path.

The winding reference air path serves as a diffusion barrier and delays, in this way, the incursion of moisture into the sensor interior, especially into the pressure chamber. Since the path is winding, it is possible to accommodate within the compact dimensions of the pressure sensor a path which is sufficiently long to attain satisfactory results. The length of the winding path amounts preferably to at least 75%, more preferably to at least 100% and especially preferably to 150%, of the length of the perimeter of the separating membrane. With reference to the axial dimension of an essentially cylindrical relative pressure sensor, the winding path is preferably at least twice as long as the separation of the atmosphere-side opening of the winding path from the plane of the measuring membrane.

In addition, the compact arrangement of the path resulting from the winding shape offers the possibility of assuring a good thermal contact between the atmosphere-side opening of the reference air path and the pressure chamber.

This is advantageous insofar as it keeps the temperature of the atmosphere-side opening of the reference air path fairly close to the temperature of the pressure chamber. Advantageously, a filter is provided at the atmosphere-side opening of the reference air path, for assuring that no condensate can penetrate into the cell. In this way, it is practically impossible that it can fall below the dew point in the pressure chamber under equilibrium conditions.

In this connection, it is advantageous, when the components of the relative pressure sensor between the pressure chamber and the winding path comprise a material of good thermal conductivity. Especially suited here are ceramics, especially aluminum oxide ceramics, as well as certain metallic alloys. It is also advantageous, when the seams between different components of the relative pressure sensor exhibit a good heat conduction. The filter element is preferably likewise made of a metallic or a ceramic material with good heat conductivity, so that the filter element assumes a sufficiently homogeneous and low temperature. Advantageously, the filter element is hydrophobic, or treated to be hydrophobic.

For assuring a good heat conduction between the pressure chamber and the winding path, there should be a sufficiently massive connection of heat conducting material between the pressure chamber and the path. Advantageously for this purpose, any cross section extending parallel to the separating membrane between any point of the winding path and the platform-side wall of the pressure chamber has a surface area fraction of heat conducting material amounting to at least 25%, preferably at least 40% and especially preferably at least 50%, of the membrane surface area.

For assuring a good thermal contact between the atmosphere-side opening of the reference air path, respectively the winding path, on the one hand, and the pressure chamber, on the other hand, as small a separation as possible is provided between these elements. The separation of the plane of the winding path from the plane of the measuring membrane is preferably smaller than the length of the winding path, especially preferably less than 75% of the length of the winding path and very specially preferably less than 50% of the length of the winding path.

For the relative pressure sensor of the invention, the following variants are among the possibilities for forming the winding path. The winding path can lie essentially in one plane, with a spiral shape being preferred. The plane of the winding path extends in such case preferably parallel to the plane of the measuring membrane.

Winding paths with, for example, a helical shape are another option, with the length of the projection of the winding path onto the plane of the membrane amounting to at least 50%, preferably at least 65%, and especially preferably at least 80% of the total length of the winding path.

The winding path can include a line-shaped depression in a surface of a component of the relative pressure sensor, with the depression being covered with a suitable, additional component.

In another embodiment, the winding path can include a winding canal, which extends in at least one component of the relative pressure sensor between two openings in surface sections of the component. This can, for example, be achieved by embedding a thread of an organic material during the forming of the green body, in order to predetermine the shape of the winding path. This thread burns during the firing of the green body, so that a capillary, winding path remains in place of the thread. The winding path can, for example, independently of the manner of its manufacture, have a cross sectional area of less than 2 $mm^2$, preferably less than 1 $mm^2$ and especially preferably lie in the range of 0.7 to 0.4 $mm^2$.

The winding path can, in principle, be arranged in the most varied of components of the relative pressure sensor. Possible components, among others, are the platform, or, for example, another component, which is secured to the platform. This other component can, for example, be a lid, or a pot, which is placed on the platform and forms a preferably hermetically-sealed chamber. Such a chamber can be suitable, especially, for accommodating the sensor electronics.

Preferably, the walls of the hermetically-sealed chamber in the pot are coated with an electrically conductive material, so that the walls of the chamber are part of a Faraday cage, which surrounds the sensor electronics and, if need be, other components of the relative pressure sensor.

For completing the Faraday cage, for instance, the lateral surfaces of the cylindrical platform of the relative pressure sensor, as well as the rear side of the platform facing away from the measuring membrane, likewise are provided with a conductive layer. On the process side, the Faraday cage can be completed by an electrode applied to the internal side of the measuring membrane facing away from the process. Between the individual components of the Faraday cage, of course, a sufficiently good electrical connection is to be assured.

The conductive layers on the lateral surface of the platform, on its rear side, on the walls of the hermetically-sealed chamber, as well as on the base surface of the pot, which is placed on the rear side of the platform, can include a vapor-deposited or sputtered metal layer, a conductive foil or a conductive, sprayed lacquer.

Currently, sputtered metal layers are preferred, with Cu-containing, especially Cu—Ni-containing layers, being especially preferred. Exceptionally preferred are sputtered layers that were sputtered by means of a target exhibiting a Cu—Ni alloy. In the case of an alloy having more copper than nickel, the corrosion resistance rises with increasing nickel. However, an increased nickel fraction can require an increased soldering temperature. Additionally, layers having a nickel fraction that markedly exceeds the copper fraction prove to be unstable. Currently, Cu—Ni alloys are preferred to have a Ni-fraction of at least 35%, preferably at least 40% and especially preferably between 42.5 and 47.5%.

The layer thickness of the metal layer is not critical, with currently a layer thickness being 0.1 μm and 2 μm being preferred. Especially preferred is a layer thickness between about 0.5 μm and 1 μm, especially about 0.7 μm. Optionally, Cr can be used as an adhesion promotor between the ceramic and the conductive layer.

The conductive layer can either completely cover the rear side of the platform facing away from the process, or it can be limited to an area lying outside of the base area of the hermetically-sealed chamber.

Similarly, the base area of the pot facing toward the platform can likewise at least sectionally be coated with the conductive material, in order to produce a conductive connection between the platform and the pot.

The mechanical connection between the pot and the platform of the relative pressure sensor can, for example, be created by a solder, a conductive adhesive, or the conductive coating itself. Especially suited is a thixotropic epoxi-adhesive, for example that named HYSOL 9093, since, with this material, the roughness of the conductive layers on the ceramic substrate is sufficient to assure an electrical connection through the thickness of the adhesive coating.

As one skilled in the art will immediately realize, the just-described aspect of the invention, namely the embodiment of the hermetically-sealed chamber being part of a Faraday cage, is not limited to relative pressure sensors, since a climate protection and EMC-protection, such as is assured in such a chamber, is fundamentally of interest for all types of pressure sensors.

As a result, the invention concerns also absolute pressure sensors and relative pressure sensors, which are not used in a significantly humid setting. Thus, the pot can also be designed without the above-described reference air path and, in case a reference air conduit is required, this can, for less moisture-critical applications, occur, for example, by a capillary tube extending in the axial direction through the pot, with the tube not communicating with the volume of the hermetically-sealed chamber.

BRIEF DESCRIPTION OF THE DRAWING

The sole FIGURE is an exploded drawing of a relative pressure sensor of the invention.

DESCRIPTION OF THE PREFERRED EMBODIMENT

The relative pressure sensor shown in the FIGURE includes a measuring cell 1, composed of a platform 10 and a measuring membrane 11 secured on the platform and forming a pressure chamber therewith. The measuring membrane 11 is loaded on its side facing away from the platform 10, during measurement operation, by the pressure being measured. The pressure chamber communicates with atmospheric pressure through a pressure chamber opening 12. The deformation of the measuring membrane results from the difference between atmospheric pressure and the pressure being measured. The deformation can be registered by one of the established measurement principles, for example the capacitive, resistive or resonance methods. Corresponding electrical quantities are led through the platform passageways 13, 14, 15 out of the platform and processed by an electrical circuit (not shown). The circuit is arranged on the platform 10 and covered with the pot 2, which is, for example, secured on the platform 10 with an adhesive having a good heat conductivity, so that the circuit is hermetically sealed and protected from moisture. The electrical signals produced by the circuit are led to the outside through passageways 23 opening on the end surface of the pot 2 facing away from the platform. The end surface of the pot 2 exhibits a spirally-shaped depression 20, which forms a winding reference air path. The depression can, for example, have a v-shaped or semicircular cross section. The cross section of the depression perpendicular to its length is about 0.5 mm². A first end of the depression 20 aligns in the axial direction with the pressure chamber opening 12. A bore 22 through the pot 2 serves as a section of the reference air path between the depression 20 and the pressure chamber. The pot 2 is, like the platform 10 and the separating membrane 11, made of corundum ceramic. The depression 20 is produced by impressing a corresponding profile into the green body of the pot 2.

For assuring a good thermal contact between the pressure chamber and the reference air path, the pot 2 is made massive in that its material is maximized, except for necessary cavities for accommodating the electronic circuit and the passageways. In this massive design, the surface area fraction occupied by material in any cross section through the pot parallel to the membrane amounts in this embodiment to at least 50% of the area of the separating membrane.

To complete the reference air path, the depression is covered with a cover 3, with such cover 3 being secured to the pot 2 with a connection of good heat conductivity, for instance an adhesive. Aligning with the second end 21 of the depression 20 is an axially directed bore in the cover 3, this bore forming the atmospheric opening 31 of the reference air path.

Arranged in the opening 31 is a filter element 4, which, in the currently preferred embodiment, is a hydrophobic, porous, ceramic filer element. Similarly suitable are metallic filter elements, or organic filter elements, for example those made of PTFE, with the filter elements being preferably hydrophobic or treated to be hydrophobic. In the spirit of good thermal contact, the filter element is secured in the inlet opening 31 with an adhesive of good heat conductivity.

Instead of the adhesive connections, fundamentally all other types of connection are suitable that enable a good conduction of heat.

Since the electronic circuit generates a small amount of waste heat, its thermal contact to the reference air path, especially to the inlet opening 31 of the reference air path, should be minimized. For this purpose, the core region of the cover 3, which is axially aligned with the circuit, is left vacant. Similarly, the central region of the end wall of the pot 2 is made thin, in order to minimize radial heat conduction.

The invention claimed is:

1. A relative pressure sensor for measuring a pressure difference between a pressure being measured and the ambient atmospheric pressure, comprising:
    a platform; and
    a measuring membrane loadable with a pressure being measured, wherein:
    said measuring membrane is secured at its edge to said platform;
    said pressure chamber is formed between said platform and said measuring membrane; and
    said pressure chamber communicates over a reference air path with the atmosphere, said reference air path includes a winding path.

2. The relative pressure sensor as claimed in claim 1, wherein:
    said winding path lies essentially in a plane.

3. The relative pressure sensor as claimed in claim 2, wherein:
    said plane extends parallel to the plane of said measuring membrane.

4. The relative pressure sensor as claimed in claim 3, wherein:
    the length of the projection of said winding path onto the plane of said membrane amounts to at least 50%, preferably at least 65%, and especially preferably at least 80% of the total length of said winding path.

5. The relative pressure sensor as claimed in claim 1, wherein:
    the length of said winding path amounts preferably to at least 75%, more preferably to at least 100% and especially preferably to 150%, of the length of the perimeter of said measuring membrane.

6. The relative pressure sensor as claimed in claim 1, wherein:
    the length of said winding path is at least twice as long as the separation of an atmosphere-side opening of said winding path from the plane of said measuring membrane.

7. The relative pressure sensor as claimed in claim 1, wherein:
    said winding path includes a line-shaped depression in a surface of a component of said relative pressure sensor.

8. The relative pressure sensor as claimed in claim 1, wherein:
    said winding path includes a winding canal, which extends in at least one component of said relative pressure sensor between two openings in surface sections of the component.

9. The relative pressure sensor as claimed in claim 1, wherein:
    said winding path has a cross sectional area of less than 2 mm², preferably less than 1 mm² and especially preferably n the range of 0.7 to 0.4 mm².

10. The relative pressure sensor as claimed in claim 1, wherein:
    the separation of the plane of said winding path from the plane of said measuring membrane is preferably smaller than the length of said winding path, especially preferably less than 75% of the length of said winding path and very specially preferably less than 50% of the length of said winding path.

11. The relative pressure sensor as claimed in claim 1, wherein:
    said winding path is in thermal contact with the platform-side wall of said pressure chamber such that any cross section extending parallel to said separating membrane between any point of said winding path and the platform-side wall of said pressure chamber has a surface area fraction of heat conducting material amounting to at least 10%, preferably at least 25% and especially preferably at least 50%, of said membrane surface area.

12. The relative pressure sensor as claim in claim 1, wherein:
said reference air path has a filter element at its atmosphere-side inlet opening, for preventing the incursion of condensate into said reference air path.

13. The relative pressure sensor as claimed in claim 12, wherein:
said filter element is in thermal contact with said winding path.

14. The relative pressure sensor as claimed in claim 12, wherein:
said filter element is hydrophobic or treated to be hydrophobic.

15. The relative pressure sensor as claimed in claim 12, wherein:
said filter element comprises one of:
a ceramic, metallic and organic material.

16. The relative pressure sensor as claimed in claim 1, wherein:
said chamber is hermetically sealed from its environment; and
additionally, at least one electronic component is arranged in said chamber.

17. The relative pressure sensor as claimed in claim 1, wherein:
said winding path extends spirally or helically.

* * * * *